US009993753B2

(12) United States Patent
Lee et al.

(10) Patent No.: US 9,993,753 B2
(45) Date of Patent: *Jun. 12, 2018

(54) HIGH-EFFICIENCY CANDLE-TYPE DEVICE FOR FILTERING BALLAST WATER HAVING HIGH-DENSITY FILTER STRUCTURE

(75) Inventors: Soo-Tae Lee, Busan (KR); Tae-Sung Pyo, Busan (KR); Su-Kyu Lee, Busan (KR)

(73) Assignee: Panasia Co., Ltd., Busan (KR)

( * ) Notice: Subject to any disclaimer, the term of this patent is extended or adjusted under 35 U.S.C. 154(b) by 596 days.

This patent is subject to a terminal disclaimer.

(21) Appl. No.: 14/351,543

(22) PCT Filed: Oct. 20, 2011

(86) PCT No.: PCT/KR2011/007820
§ 371 (c)(1),
(2), (4) Date: Apr. 11, 2014

(87) PCT Pub. No.: WO2013/054964
PCT Pub. Date: Apr. 18, 2013

(65) Prior Publication Data
US 2014/0299527 A1    Oct. 9, 2014

(30) Foreign Application Priority Data

Oct. 13, 2011 (KR) .................. 10-2011-0104773

(51) Int. Cl.
*B01D 29/68*    (2006.01)
*B01D 29/66*    (2006.01)
(Continued)

(52) U.S. Cl.
CPC .......... *B01D 29/682* (2013.01); *B01D 29/117* (2013.01); *B01D 29/52* (2013.01);
(Continued)

(58) Field of Classification Search
CPC ...... B01D 29/35; B01D 29/117; B01D 29/52; B01D 29/54; B01D 29/668; B01D 29/682;
(Continued)

(56) References Cited

U.S. PATENT DOCUMENTS 3,920,550 A * 11/1975 Farrell, Jr. .............. C02F 3/006
                                                              210/104
5,149,449 A *  9/1992 Strid ...................... B01D 29/39
                                                            210/167.31
(Continued)

FOREIGN PATENT DOCUMENTS

DE    3621724 A1 * 1/1988 ........... B01D 29/117
EP    0656223 A1 * 6/1995 ........... B01D 29/117
(Continued)

OTHER PUBLICATIONS

Machine English Translation of EP 656223 A1 Jun. 1995.*
(Continued)

*Primary Examiner* — Terry K Cecil
(74) *Attorney, Agent, or Firm* — Workman Nydegger

(57) ABSTRACT

A device for filtering ballast water which performs filtering by installing a filter element having a conical shape in a concentric circle direction inside the device for filtering ballast water that accommodates a filter portion, and introducing ballast water from a lower end of the device for filtering and passing same through the filter element inside the device for filtering, and for discharging backwash water containing foreign substances that are inside a filter by way of differential pressure, which is created by a driving portion communicating with a filter element by rotating a suction portion that is located on a lower end of the device for filtering. Particularly, the present invention relates to a high-efficiency candle-type device for filtering ballast water having a high-density filter structure, wherein the driving (Continued)

portion is positioned on a lower portion of a housing so that more filter elements can be accommodated inside the housing.

10 Claims, 10 Drawing Sheets

(51) Int. Cl.
  *B63J 4/00* (2006.01)
  *B01D 29/11* (2006.01)
  *B01D 29/52* (2006.01)
  *B01D 29/54* (2006.01)

(52) U.S. Cl.
  CPC ............ *B01D 29/668* (2013.01); *B63J 4/002* (2013.01); *B01D 29/54* (2013.01); *B01D 2201/02* (2013.01); *B01D 2201/0438* (2013.01)

(58) Field of Classification Search
  CPC .............. B01D 29/688; B01D 29/2201; B01D 29/0438; B01D 29/0453; B01D 29/02; B63J 4/002
  See application file for complete search history.

(56) References Cited

U.S. PATENT DOCUMENTS

| | | | | |
|---|---|---|---|---|
| 5,667,670 A | * | 9/1997 | Drewery | ................ B01D 24/02 |
| | | | | 210/104 |
| 6,799,687 B1 | * | 10/2004 | Schon | .................. B01D 29/117 |
| | | | | 210/333.1 |
| 2012/0125834 A1 | * | 5/2012 | Gessner | ............... B01D 29/117 |
| | | | | 210/411 |

FOREIGN PATENT DOCUMENTS

| | | |
|---|---|---|
| JP | 06-210108 A | 8/1994 |
| JP | 07-194907 A | 8/1995 |
| JP | 2009-066533 A | 4/2009 |
| JP | 2010-253338 A | 11/2010 |
| WO | 91-04778 A1 | 4/1991 |
| WO | WO 2011000471 A1 * | 1/2011 ........... B01D 29/117 |

OTHER PUBLICATIONS

International Search Report dated Oct. 23, 2012, issued in PCT Application No. PCT/KR2011/007820, filed Oct. 20, 2011.
Written Opinion dated Oct. 23, 2012, issued in PCT Application No. PCT/KR2011/007820, filed Oct. 20, 2011.

* cited by examiner

HIGH-EFFICIENCY CANDLE-TYPE DEVICE FOR FILTERING BALLAST WATER HAVING HIGH-DENSITY FILTER STRUCTURE

TECHNICAL FIELD

The present invention relates to a device for filtering ballast water, which is intended to perform filtering by concentrically installing a filter element in the ballast-water filtering device accommodating a filter portion, and introducing ballast water from a lower end of the filtering device and passing the ballast water through the filter element inside the filtering device; and to discharge backwash water containing foreign substances inside a filter by means of differential pressure, which is created between a suction portion and a filter element by rotating the suction portion located on a lower end of the filtering device to be coupled with the filter element via a driving portion. More particularly, the present invention relates to a high-efficiency candle-type device having a high-density filter structure for filtering ballast water; wherein: the driving portion is positioned on a lower portion of a housing so that more filter elements can be accommodated inside the housing, thereby increasing filter efficiency so as to be appropriate for treating ballast water; the structure is simplified to reduce sealing cost and prevent original ballast water from mixing with filtered water; installation in a small space is possible; and the filtering device can be easily repaired.

BACKGROUND ART

Ballast water means seawater that is supplied in a vessel to maintain balance of the vessel when the vessel is anchored in a certain harbor to be unloaded or sails without being loaded. In the case where the vessel filled with the ballast water is anchored in a harbor of another country and then is loaded, the ballast water in the vessel should be discharged to the harbor of the country. However, marine organism species contained in the seawater may cause damage to a marine ecosystem of another country. Therefore, it is necessary to treat ballast water in the vessel before discharging the ballast water to the sea of another country.

FIG. 1 is a sectional view showing a conventional device for filtering ballast water (hereinafter, referred to as a conventional ballast-water filtering device) using a filter, which is configured to discharge backwash water through a lower portion of the filtering device.

Referring to FIG. 1, the conventional ballast-water filtering device is configured to perform filtering by circumferentially installing a conical filter a in a cylindrical body g of the filtering device, introducing ballast water (hereinafter, referred to as original ballast water) taken from the sea through a lower end of the filtering device and passing the ballast water through the filter a in the body g of the filtering device. Further, this is configured such that, if a rotating shaft b2 passing through the body g of the filtering device and a suction portion c provided on a lower portion of the filtering device to be coupled with the rotating shaft are rotated via a motor b1 disposed on an upper portion of the filtering device to make the suction portion c communicate with the filter a, a differential pressure is generated between the suction portion c and the inside of the filtering device, so that filtered ballast water (hereinafter, referred to as filtered water) in the filtering device is introduced into the filter to wash foreign substances of the filter off and ballast water (hereinafter, referred to as backwash water) containing foreign substances flows through the suction portion c and is discharged through a discharging portion d.

The conventional ballast-water filtering device is originally used on land. For example, if it is used as a filtering device for an oil tank, only solid substances are removed and adhere to the filter, so that they are not caught in filter pores but are easily separated and removed from a filter surface when backwashing is performed using the differential pressure, thus enabling continuous filtering and thereby enhancing filtering efficiency. However, when this is used as a ballast-water filtering device for a vessel, it is difficult to separate and remove substances contained in seawater, such as microorganisms or jellyfish, from the filter pores via differential pressure because the substances have high viscosity, as a result of which it is difficult to continuously perform a similar level of filtering and thereby filtering efficiency is considerably reduced.

Particularly, the ballast-water filtering device should be configured such that the motor b1 is located on the upper portion of the filtering device, so the rotating shaft b2 passes through the inside of the body g of the filtering device so as to rotate the suction portion c provided on the lower portion of the filtering device. Thus, the rotating shaft b2 occupies a considerable space, so that a space in the filtering device is reduced and thereby it is difficult to accommodate a lot of filters a. Consequently, such a ballast-water filtering device is unsuitable for use in a marine environment, which requires high filtering efficiency.

In this case, since portions on both upper and lower surfaces of the filtering device through which the rotating shaft b2 passes require air-tightness, a structure is complicated, sealing cost is increased, and the original ballast water may be mixed with the filtered water when the sealing is defective.

Further, if the filtering device is configured so that the rotating shaft b2 of the motor b1 passes through the filtering device, it is difficult to keep the balance of the rotating shaft b2 during the installation of the filtering device.

The conventional ballast-water filtering device is problematic in that the motor b1 is provided on the upper portion of the filtering device, so that the entire height of the filtering device should be increased and thereby the filtering device occupies a significant amount of space when installed in the vessel. When the ballast-water filtering device is usually installed, as shown in FIG. 1, legs h capable of supporting the filtering-device body g are provided to secure the filtering device to the inside of the vessel. Consequently, an empty space i is formed between the above-mentioned legs h for supporting the filtering device and the lower portion of the filtering device. However, although the conventional ballast-water filtering device has such an empty space i, the motor b1 is located on the upper portion of the filtering device, such that the limited space of the vessel is inefficiently utilized.

Further, the conventional ballast-water filtering device is problematic in that an operation of removing the motor b1 from the upper portion should be preceded when the inside of the filtering device is repaired or its components are replaced with new ones, thus making it difficult to carry out repair or replacement.

Moreover, the conventional ballast-water filtering device is problematic in that, when the backwash water of the suction portion c flows along the rotating shaft, perfect sealing is not achieved at a position where the rotating shaft b2 passes through the filtering device, so that the backwash water leaks out of the filtering device, and, when the backwash water is accumulated in the discharging portion d, back pressure is created in the discharging portion d, so that a differential pressure between the suction portion c and the filter a is reduced, and thereby smooth backwashing is not achieved and filtering efficiency is lowered.

DISCLOSURE

Technical Problem

Accordingly, the present invention has been made keeping in mind the above problems occurring in the related art, and is intended to provide a candle-type device for filtering ballast water, which performs filtering by concentrically installing a filter element in the ballast-water filtering device accommodating a filter portion, and introducing ballast water from a lower end of the filtering device and passing the ballast water through the filter element inside the filtering device, and discharges backwash water containing foreign substances inside a filter by means of differential pressure, which is created between a suction force and a filter element by rotating the suction portion to be communicated with the filter element by a driving portion that is placed on a lower portion of the filtering device, so that a driving shaft does not pass through a housing body and a space is secured in the housing body to allow the number of filter elements to be increased; thus enhancing filtering efficiency with the ballast-water filtering device of the same volume.

Another object of the present invention is to provide a candle-type ballast-water filtering device, in which filter elements are arranged along one or more concentric paths having different diameters around a driving shaft, and several filter elements can be simultaneously backwashed via a suction portion having flushing arms as many as the concentric paths, thus considerably improving filtering efficiency.

A further object of the present invention is to provide a candle-type ballast-water filtering device, in which a driving shaft does not pass through a housing, so that it is unnecessary to maintain air-tightness at upper and lower covers of a housing body and thereby a structure is simple, thus achieving a reduction in sealing cost and preventing original ballast water from being mixed with filtered water due to defective sealing.

Yet another object of the present invention is to provide a candle-type ballast-water filtering device, which is configured as described above, so that a structure is simplified, thus making it easy to install and obviating the necessity of setting a center of a driving shaft.

A still further object of the present invention is to provide a candle-type ballast-water filtering device, which is configured as described above, so that a worker has only to remove an upper portion of a housing and an upper cover without the necessity of removing a driving portion even when an inside of the filtering device is repaired or its components are replaced with new ones, thus ensuring convenient maintenance; and in which an entire height of the filtering device is lower as compared to a configuration wherein the driving portion is provided on an upper portion of the filtering device, thus allowing the device to be installed in a relatively small space in a vessel.

An additional object of the present invention is to provide a candle-type ballast-water filtering device, in which an airtight sealing portion is precisely formed around a driving shaft to prevent backwash water of a suction portion from leaking out of the housing along the driving shaft, thus significantly improving the air-tightness of the filtering device, and in which a back-pressure prevention tank is installed at an end of a discharge line of a discharging portion and is configured to discharge backwash water when the backwash water accumulated in the back-pressure prevention tank exceeds a predetermined water level, thus preventing back pressure from being created and enabling uniform backwashing, therefore maintaining the filtering capacity of the ballast-water filtering device.

Technical Solution

In order to accomplish the above objects, a candle-type ballast-water filtering device is configured as follows.

In an aspect, the present invention provides a candle-type ballast-water filtering device, including a housing having an inlet portion and an outlet portion that allows ballast water to flow into and out of a vessel; a filter portion located in the housing to filter original ballast water introduced through the inlet portion; and an automatic washing portion washing foreign substances off of the filter portion, wherein the automatic washing portion is located in a lower portion of the filtering device, and includes a suction portion that sucks backwash water containing foreign substances attached to the filter portion, a driving portion that is connected to the suction portion to rotate the suction portion, and a discharging portion that accommodates a side of the suction portion and discharges backwash water sucked by the suction portion, the filter portion includes one or more filter elements for filtering and backwashing, the filter elements arranged along concentric paths around a driving shaft of the driving portion, the suction portion includes one or more flushing arms that rotate around the driving shaft by the driving portion to communicate with the respective filter elements on the concentric paths of the filter portion and thereby receive backwash water, and the driving portion is located in a lower portion of the housing to be connected to the suction portion via the driving shaft, thus allowing more filter elements to be accommodated in the housing, enabling the device to be installed even in a small space, and making it easy to repair the device.

According to an aspect of this invention, the suction portion may further include a flushing body that communicates with the flushing arms to render the sucked backwash water to pass and is secured to the driving shaft to transmit a rotating force from the driving shaft to the suction portion, the filter elements may be arranged along the one or more concentric paths having different diameters around the driving shaft, and the one or more flushing arms may be radially arranged around the driving shaft to communicate with one filter element on each of the concentric paths.

According to another aspect of this invention, the flushing body may include a driving-shaft locking means to lock an end of the driving shaft.

According to a further aspect of this invention, the driving-shaft locking means may include a bar plate crossing a central line of the flushing body, and the driving shaft may include on an end thereof a plate groove into which the bar plate is fitted.

According to yet another aspect of this invention, the driving portion may include an airtight sealing portion to prevent the backwash water of the suction portion from leaking out of the housing along the driving shaft, thus improving air-tightness of the driving shaft.

According to another aspect of this invention, the airtight sealing portion may include a rotor secured to the driving shaft to rotate along with the driving shaft; a stator forming a perturbation surface in cooperation with the rotor and secured to the support plate; a driving-shaft casing accommodating the stator and the rotor and surrounding the driving shaft; and a support plate supporting the driving-shaft casing and the stator, and coupled to a bottom of the housing.

According to another aspect of this invention, the rotor may include a rotor packing that pressurizes a rotor perturbation ring downwards by a restoring force of a spring provided in a recess, the rotor perturbation ring that forms a perturbation surface in cooperation with a stator perturbation ring to come into close contact therewith by pressure of the rotor packing, a cap plate transmitting the restoring force of the spring to a lower portion of the rotor packing, and a rotor casing surrounding the rotor packing and the rotor perturbation ring, and the stator may include a stator packing that is secured to the support plate to support a stator perturbation ring, and the stator perturbation ring that comes into close contact with the stator packing and forms the perturbation surface in cooperation with the rotor perturbation ring.

According to another aspect of this invention, the discharging portion may include a back-pressure prevention tank on one discharge line that is provided under the suction portion to communicate therewith, so that backwash water and foreign substances of the discharge line may be primarily stored in the back-pressure prevention tank, thus preventing back pressure on the discharge line from increasing.

According to another aspect of this invention, the back-pressure prevention tank may be configured such that an outlet port for discharging the backwash water is located to be lower than an inlet port for introducing the backwash water, so that a water level in the back-pressure prevention tank is kept lower than the inlet port, thus preventing the back pressure on the discharge line from increasing.

According to another aspect of this invention, the back-pressure prevention tank may include a water-level measuring sensor measuring a water level in the tank, and a pump operated to discharge wash water stored in the tank when the water level measured by the water-level measuring sensor exceeds a predetermined level, thus keeping the water level in the tank to a predetermined level or less and preventing the back pressure on the discharge line from increasing.

Advantageous Effects

The present invention can achieve the following effects by the above-mentioned aspects and configuration, combination, and use that will be described below.

The present invention is advantageous in that it performs filtering by concentrically installing a filter element in a ballast-water filtering device accommodating a filter portion, and introducing ballast water from a lower end of the filtering device and passing the ballast water through the filter element inside the filtering device, and it discharges backwash water containing foreign substances inside a filter by means of differential pressure, which is created between a suction force and a filter element by rotating the suction portion to be communicated with the filter element by a driving portion that is placed on a lower portion of the filtering device, so that a driving shaft does not pass through a housing body and a space is secured in the housing body to allow the number of filter elements to be increased, thus enhancing filtering efficiency with the ballast-water filtering device of the same volume.

The present invention is advantageous in that filter elements are arranged along one or more concentric paths having different diameters around a driving shaft, and several filter elements can be simultaneously backwashed via a suction portion having flushing arms as many as the concentric paths, thus considerably improving filtering efficiency.

The present invention is advantageous in that a driving shaft does not pass through a housing, so that it is unnecessary to maintain air-tightness at upper and lower covers of a housing body and thereby a structure is simple, thus achieving a reduction in sealing cost and preventing original ballast water from being mixed with filtered water due to defective sealing.

The present invention is advantageous in that it is configured as described above, so that a structure is simplified, thus making it easy to install and obviating the necessity of setting a center of a driving shaft.

The present invention is advantageous in that it is configured as described above, so that only an upper portion and an upper cover of a housing have only to be removed without the necessity of removing a driving portion even when an inside of the filtering device is repaired or its components are replaced with new ones, thus ensuring convenient maintenance, and in that an entire height of the filtering device is lower as compared to a configuration wherein the driving portion is provided on an upper portion of the filtering device, thus allowing the device to be installed in a relatively small space in a vessel.

The present invention is advantageous in that an airtight sealing portion is precisely formed around a driving shaft to prevent backwash water of a suction portion from leaking out of the housing along the driving shaft, thus significantly improving the air-tightness of the filtering device, and in that a back-pressure prevention tank is installed at an end of a discharge line of a discharging portion and is configured to discharge backwash water when the backwash water accumulated in the back-pressure prevention tank exceeds a predetermined water level, thus preventing back pressure from being created and enabling uniform backwashing, therefore maintaining the filtering capacity of the ballast-water filtering device.

Figure 1:
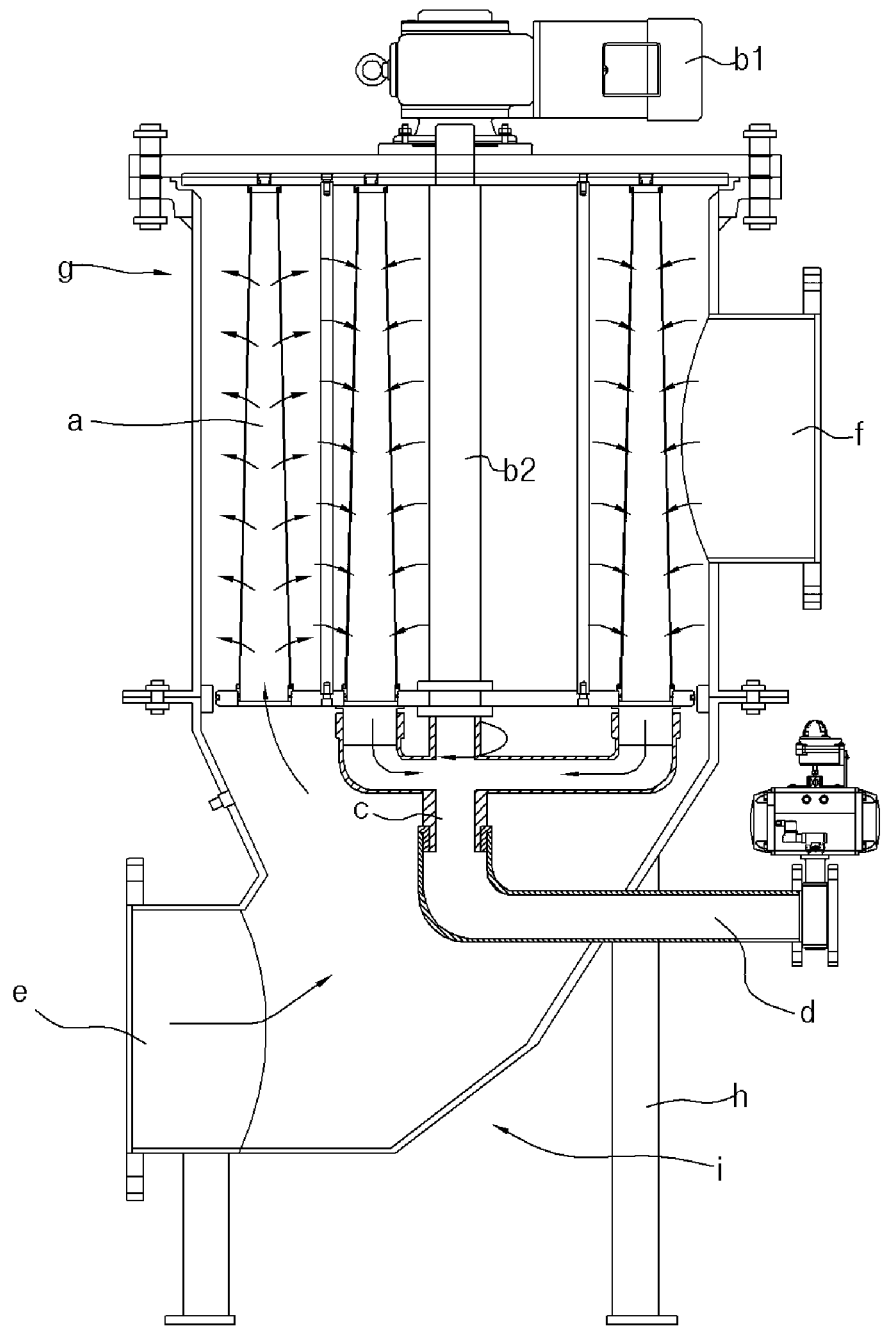
FIG. 1 is a sectional view showing a conventional ballast-water filtering device using a filter.

DESCRIPTION OF REFERENCE NUMERALS OF IMPORTANT PARTS a: conical filter
b1: motor
b2: rotating shaft
c: suction portion
d: discharging portion
e: inlet portion
f: outlet portion
g: body of filtering device
h: leg
i: empty space defined in lower portion of filtering device
1: ballast-water filtering device
2: housing
21: inlet portion
22: lower portion of housing
22a: penetrating portion of lower portion of housing
23: body of housing
231: upper cover
231a: protrusion 231a': fastening screw 231b: protrusion 231c: coupling hole
232: lower cover 233: support shaft 235: fastening screw 237', 237", 237''': concentric path
24: outlet portion 25: upper portion of housing
3: filter portion
31: filter element
4: automatic washing portion
40: perturbation surface
41: suction portion
411: flushing arm
411a: backwash-water entry port 411b: end portion
412: flushing body 413: driving-shaft locking means
414: bar plate 415: locking pin
417: backwash-water moving passage 419: bearing
42: driving portion
421: driving shaft
421a: driving shaft of small diameter
421b: driving shaft of large diameter
423: end of driving shaft
425: plate groove
425a: width of plate groove 425b: depth of plate groove
427, 427': coupling hole
43: discharging portion
43a: penetrating portion of discharging portion
432: discharge line 434: back-pressure prevention tank
435: water-level measuring sensor
436: inlet port 437: pump
438: outlet port
44: airtight sealing portion
45: rotor
450: spring
451: rotor packing
4510: upper portion of packing 4512: packing body
4514: lower portion of packing
452: recess 453: perturbation ring of rotor
455: cap plate
455a: horizontal plate 455b: vertical bent plate
457: rotor casing 461: perturbation ring of stator
46: stator
461: perturbation ring of stator
463: stator packing
463a: horizontal plate 463b: vertical bent plate
47: driving-shaft casing 48: support plate
A: ballast water introduced into housing body
B: filtered ballast water
C: backwashing and sucked ballast water
D: filtered ballast water discharged from housing body
E: discharged backwash water

DETAILED DESCRIPTION OF THE PREFERRED EMBODIMENTS

Hereinafter, preferred embodiments of a candle-type ballast-water filtering device according to the present invention will be described with reference to the accompanying drawings. When it is determined that the detailed description of the known art related to the present invention may obscure the gist of the present invention, the detailed description will be omitted. The terms or words used in the specification and claims are not limited to the meanings found in a dictionary, but must be understood as having meanings and concepts which are defined within the scope of the invention, as long as the inventor can appropriately define the concepts of terms so as to best explain the invention.

Figure 2:
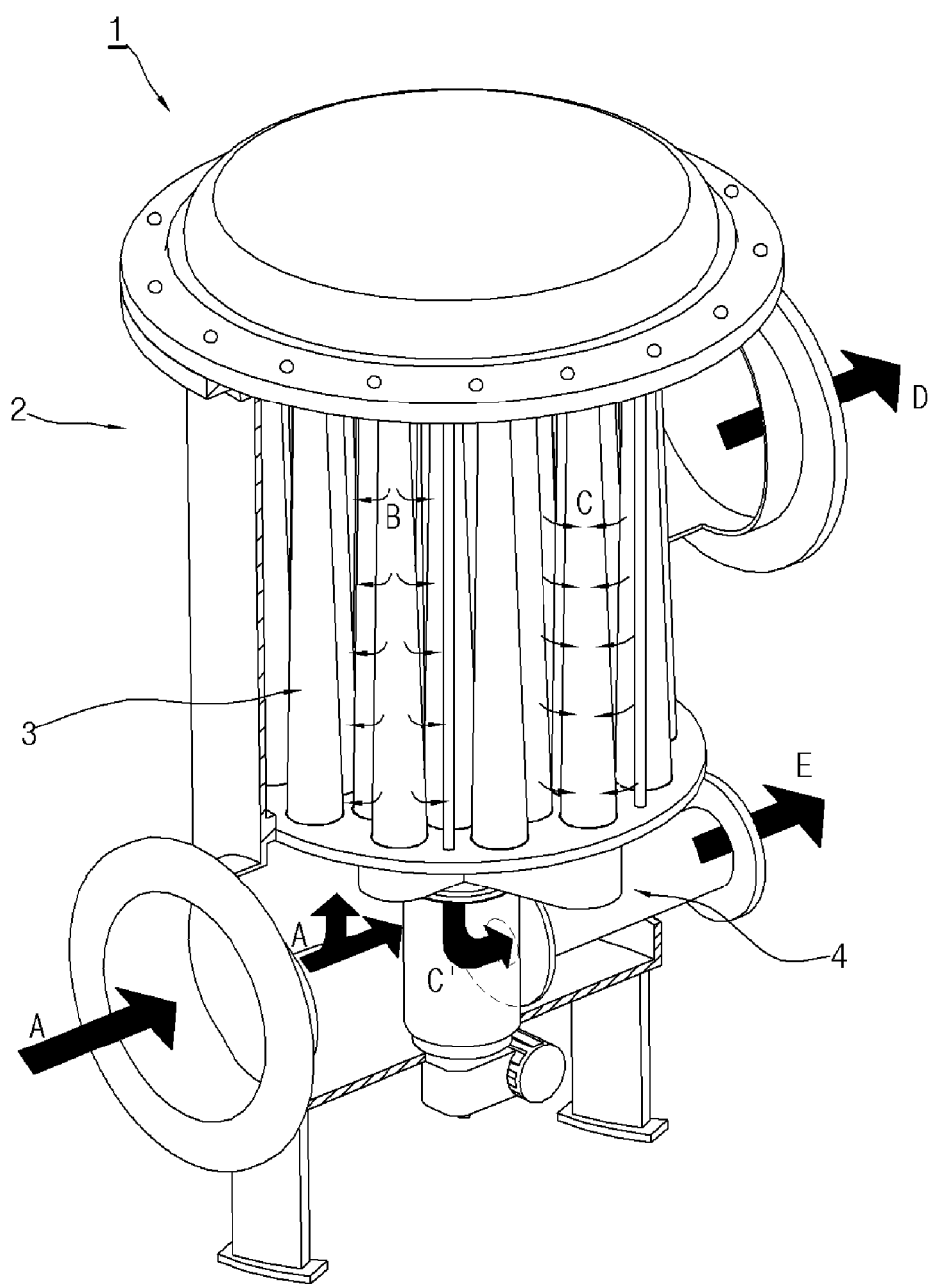
FIG. 2 is a perspective view showing a candle-type ballast-water filtering device according to a first embodiment of the present invention.
Figure 3:
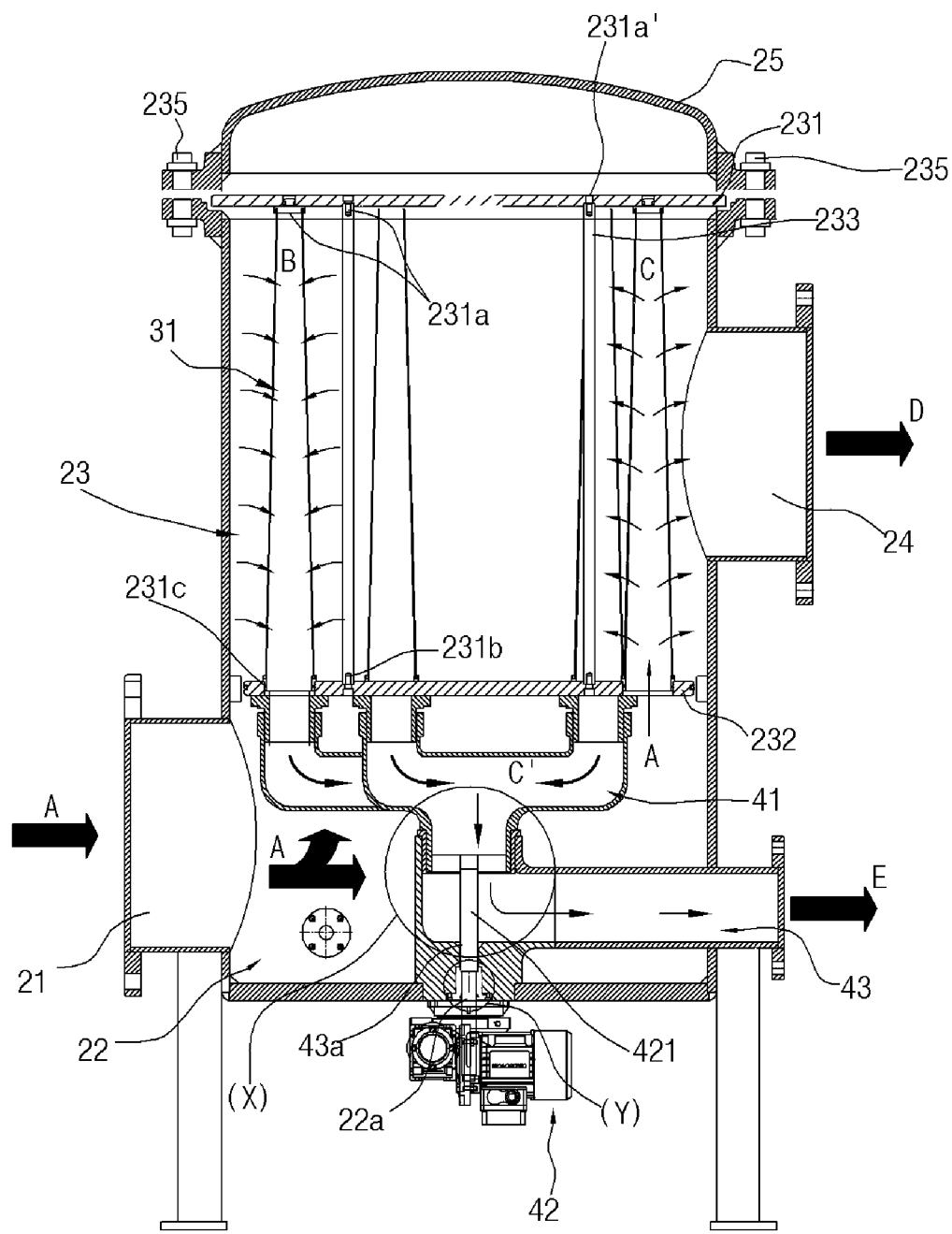
FIG. 3 is a vertical sectional view of FIG. 2.

FIG. 2 is a perspective view showing a candle-type ballast-water filtering device 1 according to a first embodiment of the present invention, and FIG. 3 is a vertical sectional view of FIG. 2.

Referring to FIGS. 2 and 3, the candle-type ballast-water filtering device 1 according to the first embodiment of the present invention may include a housing 2 having an inlet portion 21 and an outlet portion 24 that allows ballast water to flows into and out of a vessel. A filter portion 3 is located in the housing 2 to filter original ballast water introduced through the inlet portion 21. An automatic washing portion 4 functions to wash foreign substances off of the filter portion 3.

The housing 2 is configured to define a body of the candle-type ballast-water filtering device 1 according to the present invention, and may preferably have a cylindrical shape to accommodate the filter portion 3 for filtering the ballast water while allowing ballast water to flow along an inner wall without being subjected to large resistance. The housing 2 includes an inlet portion 21 into which ballast water taken from seawater is introduced, a lower portion 22 in which original ballast water introduced through the inlet portion 21 remains while circulating through the inner wall before entering the filter portion 3 of a housing body 23, the housing body 23 accommodating the filter portion 3 for filtering and backwashing (described below in detail) ballast water that enters the lower portion 22, an outlet portion 24 through which water filtered through the filter portion 3 in the housing body 23 is discharged, and an upper portion 25 which covers the housing body 23 to prevent it from being damaged. The upper portion 25 is fastened to the housing body 23 via a fastening screw 235.

The inlet portion 21 is configured to permit the inflow of the ballast water taken from the seawater, and is preferably formed through a side surface of the lower portion 22 in a cylindrical shape. As shown in FIGS. 2 and 3, the inlet portion 21 is located on a lower portion of the ballast-water filtering device 1, so that original ballast water passing through the inlet portion 21 fills the lower portion 22 and creates a sufficient level of water pressure before moving to the housing body 23 (see arrow A of FIGS. 2 and 3).

The lower portion 22 is a space through which original ballast water introduced into the inlet portion 21 passes before approaching the filter portion 3 of the housing body 23, and may be preferably formed in a cylindrical shape to allow original ballast water introduced through the inlet portion 21 to flow along the inner wall without being subjected to large resistance, prior to approaching the filter portion 3. A lower cover 232 of the housing 2 that will be described below is configured such that the filter element 31 passes through the lower cover to communicate with the lower portion 22 of the housing. If the original ballast water entering the lower portion 22 through the inlet portion 21 comes near to the lower cover 232, the water enters the filter element 31 by means of a pressure difference. Meanwhile, original ballast water that does not enter the filter element 31 flows along the inner surface of the lower portion 22. If original ballast water near the lower cover 232 enters the filter element 31, a water pressure near the lower cover 232 is reduced and original ballast water moves up from a position under the lower portion 22 of the housing, comes close to the lower cover 232 and enters the filter element 31 using a pressure difference. Such a process is repeated. As shown in FIGS. 2 and 3, the lower portion 22 of the housing includes a suction portion 41, a driving portion 42 and a discharging portion 43, which will be described below. The discharging portion 43 may be configured to pass through a side surface of the lower portion 22.

The housing body 23 is configured to accommodate the filter portion 3 for filtering and backwashing (described below in detail) ballast water that is introduced from the lower portion 22 of the housing. The housing body includes an upper cover 231 that seals the top of the housing body 23, a lower cover 232 that covers a bottom of the housing body 23 with the filter element 31 passing therethrough, and a support shaft 233 that connects the upper and lower covers 231 and 232 to each other to support them.

The upper cover 231 is configured to seal the top of the housing body 23, and is preferably in a disc shape to cover the top of the housing body 23 and thereby isolate the filter portion 3 accommodated in the housing body 23 and the filtered water from the outside. The upper cover 231 has on its inner surface protrusions 231a of several sizes, and the protrusions 231a are inserted into inner surfaces of upper portions of the filter element 31 and the support shaft 233 and then may be fastened by fastening screws 231a'. Unlike the lower cover 232 that will be described below, the top of the filter element 31 is completely closed by the upper cover 231, thus preventing the ballast water from escaping through the top of the filter element 31.

Figure 4:
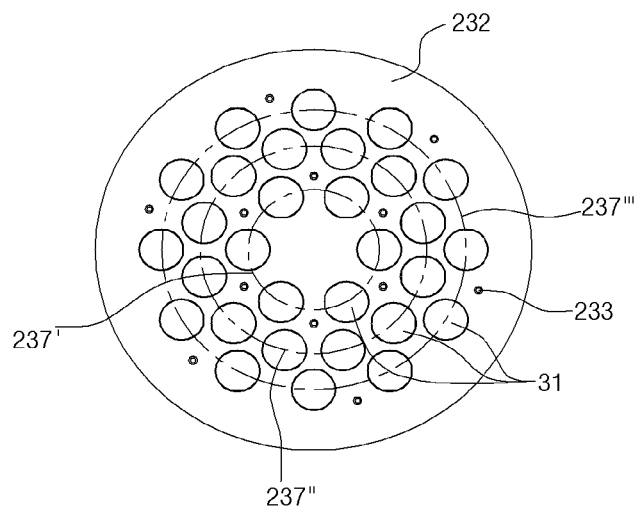
FIG. 4 is a plan view showing a lower cover 232.

The lower cover 232 is configured to cover the bottom of the housing body 23 with the filter element 31 passing therethrough, and is preferably in a disc shape to cover the bottom of the housing body 23 and prevent ballast water filtered by the filter element 31 in the housing body 23 from being mixed with the original ballast water in the lower portion 22 of the housing. The lower cover 232 has on an inner surface of the housing body 23 protrusions 231b of several sizes or a coupling hole 231c. The protrusions 231b are inserted into the inner surface of the upper portion of the support shaft 233, or the lower portion of the filter element 31 is inserted into and coupled to the coupling hole 231c, so that the lower cover 232 is secured to the housing body 23. As shown in FIG. 4, filter elements 31 pass through an outer surface of the housing body 23 associated with the lower cover 232 via corresponding coupling holes 231c, so that the filter elements are disposed at predetermined intervals on concentric paths 237', 237'' and 237''' around the driving shaft 421 and communicate with the lower portion 22 of the housing. In contrast, a surface of the lower cover 232 surrounding the filter element 31 is air-tightly sealed, thus completely isolating the lower portion 22 of the housing from the housing body 23. Then, as the suction portion 41 that will be described below rotates around the driving shaft 421 on the lower cover 232, it communicates with one filter element on each concentric path 237', 237'', 237'''. Thus, the original ballast water is filtered merely by the filter element 31, and the filtered original ballast water (filtered water) flows into the housing body 23. Then, if the suction portion 41 rotates around the driving shaft 421 and communicates with one filter element on each concentric path 237', 237'', 237''', the water is introduced into the filter element 31, so that it performs backwashing and is discharged through the suction portion 41.

The support shaft 233 connects the upper and lower covers 231 and 232 to each other to support them, is preferably placed in a vertical direction in space between the plurality of filter elements 31 and is coupled to the protrusions 231a' and 231b of the upper and lower covers 231 and 232, thus fixing the upper and lower covers 231 and 232 and supporting the housing body 23 in the form of a rod.

The outlet portion 24 is configured such that the ballast water filtered through the filter portion 3 in the housing body 23 is discharged therethrough, and is preferably formed through a side surface of the housing body 23 in the cylindrical shape. As shown in FIGS. 2 and 3, the inlet portion 21 is located on a side surface of the lower portion 22, while the outlet portion 24 is located on a side surface of the housing body 23 in such a way as to be opposite to and higher than the inlet portion. Thus, if the ballast water flows into the inlet portion 21, it is introduced into the filter element 31 while filling the lower portion 22 of the housing. Thereby, the filtered ballast water is discharged through the outlet portion 24 (see arrow D of FIGS. 2 and 3).

The filter portion 3 is positioned in the housing 2 and is configured to filter the ballast water introduced through the inlet portion 21. Preferably, the filter portion is configured to include a plurality of conical filter elements 31 that are disposed along the concentric paths 237', 237'', 237''' around the driving shaft 421 of the driving portion 42 and serve to perform filtering and backwashing (described below in detail).

The filter element 31 is configured to filter foreign substances of a predetermined size from the original ballast water, and is preferably a conical filter whose sectional area is increased in a direction from an upper position to a lower position. The ballast water introduced through the inlet portion 21 disposed in the lower portion 22 enters the filter element 31 to be filtered (see arrow B of FIGS. 2 and 3). By a differential pressure in the suction portion 41 caused by the movement of the filtered backwash water in the housing body 23, the water flows into the filter element 31 and foreign substances attached to the inner wall of the filter element 31 are conveyed to the suction portion 41 (see arrow C of FIGS. 2 and 3). One or more filter elements 31 may be present and arranged along one or more concentric paths 237', 237'', 237''' having different diameters around the driving shaft 421 (see FIG. 4).

The automatic washing portion 4 is configured to wash foreign substances off of the filter portion 3, and may preferably include a suction portion 41, a driving portion 42, and a discharging portion 43. The suction portion 41 is located in the lower portion 22 of the housing and sucks backwash water containing foreign substances attached to the filter portion 3. The driving portion 42 is connected to the suction portion 41 to rotate the suction portion 41. The discharging portion 43 accommodates a side of the suction portion 41 and discharges backwash water sucked by the suction portion 41.

The suction portion 41 is configured to suck backwash water containing foreign substances attached to the filter portion 3. The suction portion 41 is connected to the driving portion 42 that will be described below, and is rotated in the lower portion 22 of the housing by power transmitted from the driving portion 42 and communicates with each filter element 31 at a predetermined angular speed. Since the suction portion 41 exhibits a considerably lower pressure as compared to the inside of the housing 2, foreign substances attached to the inner wall of the filter element 31 fall to the suction portion 41 as a result of a filtering operation using the differential pressure and the gravity. At this time, water around the filter element 31 is also introduced into the filter element 31 by the differential pressure to be sucked towards the suction portion 41. Such a process is referred to as backwashing, and backwash water containing the foreign substances is transmitted (see arrows C and C' of FIGS. 2 and 3). The lower end of the suction portion 41 is inserted into the discharging portion 43 to communicate therewith. Since a bearing 419 is provided between the suction portion 41 and the discharging portion 43, the suction portion 41 is rotatable while being inserted into the discharging portion 43.

The driving portion 42 is configured to be connected to a side of the suction portion 41 and thereby rotate the suction portion 41, and produces power to rotate the driving shaft 421 and also rotate the suction portion 41 connected thereto. In the conventional ballast-water filtering device having the driving portion at the upper position, the motor is disposed on the upper portion of the filtering device, so that the rotating shaft should pass through the inside of the filtering device so as to rotate the suction portion disposed on the lower portion of the filtering device, and thus space in the filtering device is reduced. Consequently, it is difficult to accommodate many filters, so that the conventional device is unsuitable for a marine use requiring high filtering efficiency. Further, in such a case, air-tightness is required at both the upper and lower surfaces of the filtering device through which the rotating shaft passes, so that a structure is complicated, a lot of sealing cost is incurred, original ballast water may be undesirably mixed with filtered water when sealing is defective, and it is difficult to balance the rotating shaft during the installation. In addition, since the motor is provided on the upper portion of the filtering device, the entire height of the filtering device is increased and thus the device undesirably takes up much space when the device is installed in the vessel. Further, when it is required to repair the inside of the filtering device or replace its components with new ones, the operation of removing the motor provided on the upper portion should be preceded, thus making it difficult to repair and replace.

However, according to the present invention, the driving portion 42 is not located on the upper portion of the ballast-water filtering device 1 but is located on the lower portion of the housing, so that the driving shaft 421 does not pass through the housing body 23, and thus a sufficient space is secured in the housing body 23. Thereby, the number of filter elements 31 can be increased, so that filtering efficiency can be increased in the ballast-water filtering device 1 of the same volume. Further, since the driving shaft 421 does not pass through the housing 2, it is unnecessary to maintain air-tightness on the upper and lower covers 231 and 232 of the housing body 23, and thus the structure is simplified. Consequently, sealing cost is reduced, and a problem wherein the original ballast water is mixed with the filtered water does not occur. Further, the structure is simplified, thus affording easy installation, and it is unnecessary to set the center of the driving shaft 421. In addition, even when the inside of the filtering device 1 or its components are replaced with new ones, a worker has only to remove the upper portion 25 of the housing and the upper cover 231 without the necessity of removing the driving portion 42, thus ensuring convenient maintenance. As compared to a configuration wherein the driving portion 42 is provided on the upper portion of the filtering device 1, the entire height of the filtering device is reduced, thus allowing the device to be installed in a relatively small space in the vessel.

Figure 6:
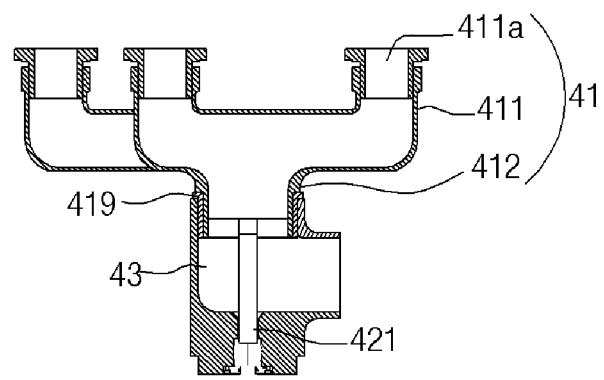
FIG. 6 is a vertical sectional view showing the suction portion.

The discharging portion 43 is configured to accommodate a side of the suction portion 41 and to discharge backwash water sucked from the suction portion 41. Preferably, as shown in FIG. 6, the discharging portion 43 accommodates a flushing body 412 of the suction portion 41 which will be described below, with the bearing 419 interposed between the discharging portion and the suction portion, so that both communicate with each other, extend in a vertical direction and then are perpendicularly bent again to pass through a surface of the lower portion 22 of the housing in the form of a conduit. The driving shaft 421 coupled with the suction portion 41 passes through the discharging portion 43 towards a ground, and the bearing 419 allows the suction portion 41 to be rotated on the discharging portion 43. The backwash water sucked through the above-mentioned suction portion 41 passes through the flushing body 412 of the suction portion 41 and is then discharged through the discharging portion 43 (see arrow E of FIGS. 2 and 3).

Figure 5:
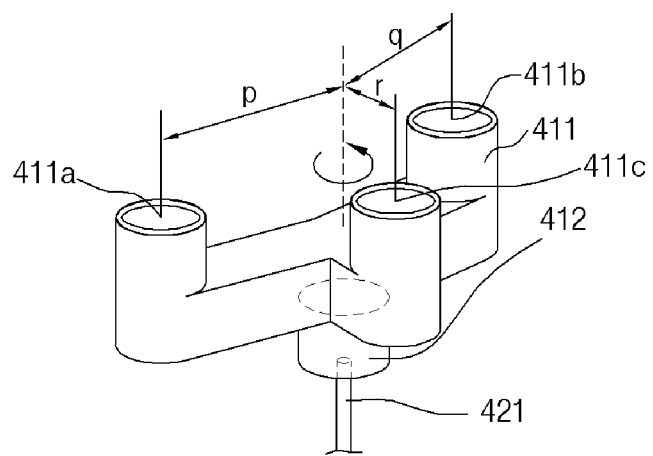
FIG. 5 is an enlarged view showing portion X encircled in FIG. 3, that is, an enlarged perspective view of a suction portion.
Figure 7:
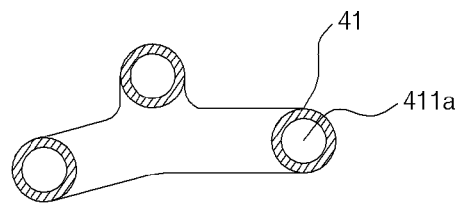
FIG. 7 is a horizontal sectional view showing a flushing arm.
Figure 8:
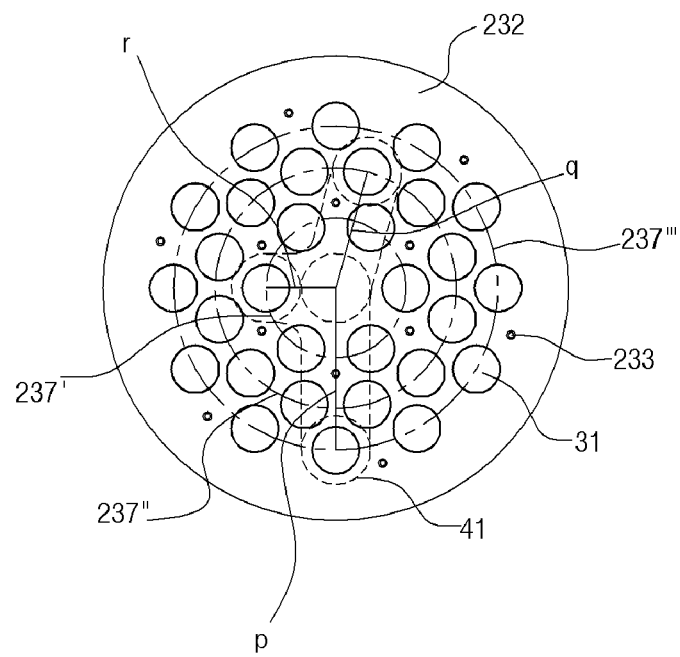
FIG. 8 is a conceptual view showing a state where a flushing arm communicates with a filter element above the lower cover of a housing.

FIG. 4 is a plan view showing the lower cover 232, FIG. 5 is an enlarged view showing portion X encircled in FIG. 3, that is, an enlarged perspective view of the suction portion 41, FIG. 6 is a vertical sectional view showing the suction portion 41, FIG. 7 is a horizontal sectional view showing a flushing arm 411, and FIG. 8 is a conceptual view showing a state where the flushing arm 411 communicates with the filter element 31 above the lower cover 232 of the housing 2.

Referring to FIGS. 5 to 7, in a candle-type ballast-water filtering device 1 according to a second embodiment of the present invention, the suction portion 41 includes the flushing arm 411 that is formed on an end thereof and rotates on the lower cover 232 to communicate with the filter element 31 and thereby suck backwash water, and a flushing body 412 that moves backwash water sucked through the flushing arm 411 and transmits a rotating force from the driving shaft 421 to the suction portion 41.

The flushing arm 411 is provided on an end of the suction portion 41 and is configured to communicate with the filter element 31 while rotating on the lower cover 232, thus sucking backwash water. Preferably, as the flushing arm rotates around the driving shaft 421 by the driving portion 42 and sequentially communicates with the filter element 31 passing through the lower cover 232, it sucks backwash water containing foreign substances attached to the inner wall of the filter element 31 by the differential pressure, in the form of a cylindrical conduit. Preferably, as shown in FIGS. 5 and 6, the flushing arm 411 is configured such that backwash-water entry ports 411*a*, 411*b* and 411*c* are formed in conduits each having a predetermined depth in a vertical direction, and ends thereof are bent towards the rotating shaft to be coupled again with the flushing body 412 having a predetermined depth at a central portion of the shaft. Since the flushing body 412 is coupled again with the driving shaft 421 to transmit the rotating force from the driving portion 42 to the flushing arm 411, the flushing arm 411 may rotate at a predetermined angular speed on the lower cover 232 by the driving portion 42. As described above, filter elements 31 may pass through the lower cover 232 to communicate with the lower portion 22 of the housing and may be arranged at predetermined intervals on the concentric circles 237', 237" and 237'" around the driving shaft 421 on the lower cover 232. In this case, the suction portion 41 may have flushing arms 411 as many as the concentric circles 237', 237" and 237'". Since the concentric circles 237', 237" and 237'" have different radii, the suction portion 41 also has flushing arms 411 of different lengths p, q and r around the central shaft 421. The radii of the concentric circles 237', 237" and 237'" and the lengths p, q and r of the flushing arms 411 form one-to-one correspondence (see FIG. 8).

The flushing arm 411 communicates with each filter element 31 to receive backwash water for a predetermined period of time. When the predetermined period of time has elapsed, the flushing arm rotates along the concentric circles 237', 237" and 237'" by the driving portion 42 to communicate with a subsequent filter element 31 and then receives backwash water again for a predetermined period of time. Such a process is repeated.

The flushing body 412 is configured to move backwash water sucked through the flushing arm 411 and transmit the rotating force from the driving shaft 421 to the suction portion 41. Preferably, the flushing body 412 communicates with an end of the flushing arm 411 which is opposite to the filter element 31, thus defining a conduit. The flushing body 412 is secured to the driving shaft 421 of the driving portion 42 and thereby to transmit the rotating force from the driving shaft 421 to the flushing arm 411.

According to the preferred embodiment of the present invention, as shown in FIG. 4, the plurality of filter elements 31 may be arranged along one or more (three in the drawing) concentric paths 237', 237" and 237'" having different diameters around the driving shaft 421 while passing through the lower cover 232. In this case, as shown in FIGS. 5 to 8, a plurality of flushing arms 411 may be radially formed around the driving shaft 421 to communicate with the filter elements 31 on the respective concentric paths. As described above, according to the present invention, the driving portion 42 is provided on the lower portion 22 of the housing, thus maximizing the space of the housing body 23 and allowing the filter elements 31 to be installed at high density. As such, since the suction portion 41 has the plurality of flushing arms 411, at least one or more filter elements 31 may be simultaneously backwashed along the one or more concentric paths having different diameters, as a result of which filtering efficiency is significantly improved as compared to the prior art. In this case, the respective flushing arms 411 have different directions and lengths, but are united at the central portion to be coupled to the flushing body 412. FIG. 8 is a conceptual view showing the state where the flushing arm 411 communicates with the filter element 31 on the lower cover 232 of the housing 2.

Figure 9:
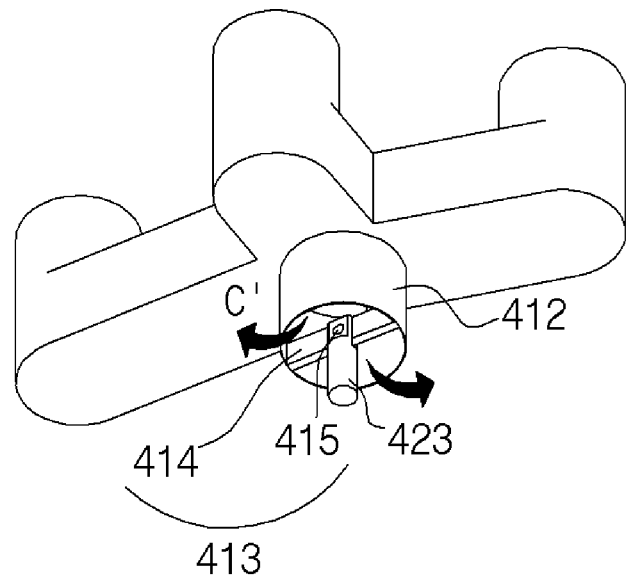
FIG. 9 is an enlarged view showing portion Y encircled in FIG. 3, that is, an enlarged perspective view showing a state where a bar plate of a flushing body communicates with an end of a driving shaft.
Figure 10:
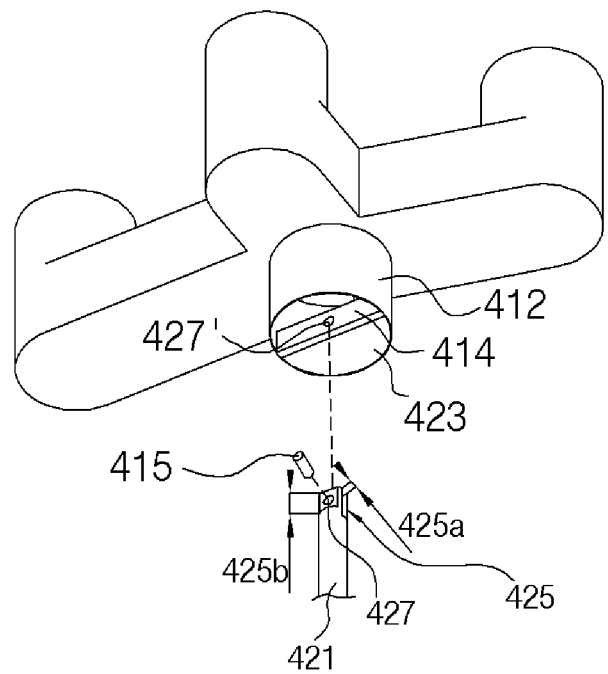
FIG. 10 is an exploded perspective view of FIG. 9.
Figure 11:
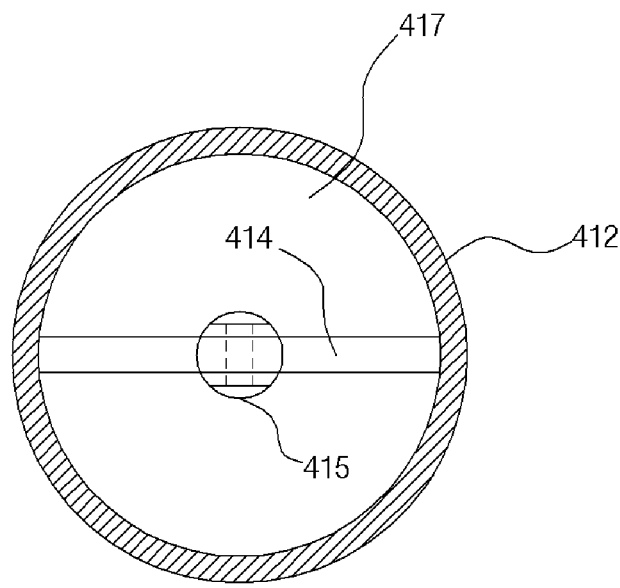
FIG. 11 is a horizontal sectional view showing the flushing body of FIG. 9.

FIG. 9 is an enlarged view showing portion Y encircled in FIG. 3, that is, an enlarged perspective view showing a state where a bar plate 414 of a flushing body 412 communicates with an end 423 of a driving shaft. FIG. 10 is an exploded perspective view of FIG. 9. FIG. 11 is a horizontal sectional view showing the flushing body 412 of FIG. 9.

Referring to FIG. 9, in a candle-type ballast-water filtering device 1 according to a third embodiment of the present invention, the flushing body 412 includes a driving-shaft locking means 413 that locks an end 423 of the driving shaft.

The driving-shaft locking means 413 refers to all configurations for locking the end 423 of the driving shaft. Preferably, as shown in FIGS. 9 to 11, the locking means includes a bar plate 414 crossing a central line of the flushing body 412, and a locking pin 415 locking the bar plate 414 to the end 423 of the driving shaft. As shown in FIGS. 10 and 11, the bar plate 414 is a rectangular parallel-piped thin plate that horizontally crosses a conduit of the flushing body 412, a coupling hole 427 being formed in the plate so that the locking pin 415 is inserted into the coupling hole to be coupled to the end 423 of the driving shaft. A sufficient sectional area 417 is provided in portions other than the bar plate 414 to permit the movement of the backwash water. Here, the end 423 of the driving shaft has a plate groove 425 so that the bar plate 414 is fitted therein. The plate groove 425 has a width 425a to allow the thickness of the bar plate 414 to be received therein and a depth 425b to allow the bar plate 414 to be seated therein. Further, the plate groove 425 also has a coupling hole 427' for coupling the locking pin 415 when the bar plate 414 is fitted in the plate groove. Such a configuration firmly locks the bar plate 414 to the end 423 of the driving shaft via the locking pin 415, thus allowing the suction portion 41 coupled to the bar plate 414 to be rotated together when the driving shaft 421 rotates.

Figure 12:
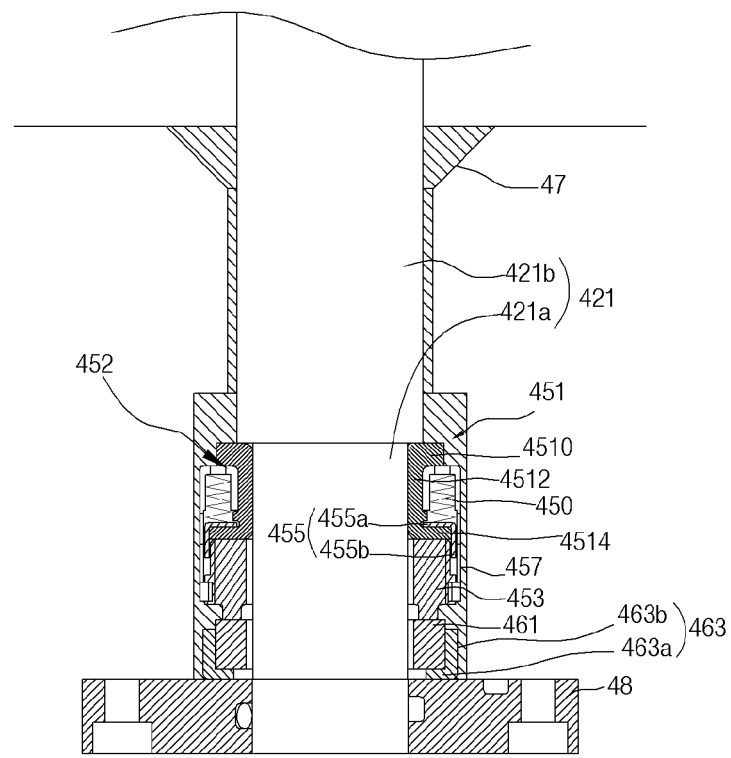
FIG. 12 is a vertical sectional view showing an airtight sealing portion.
Figure 13:
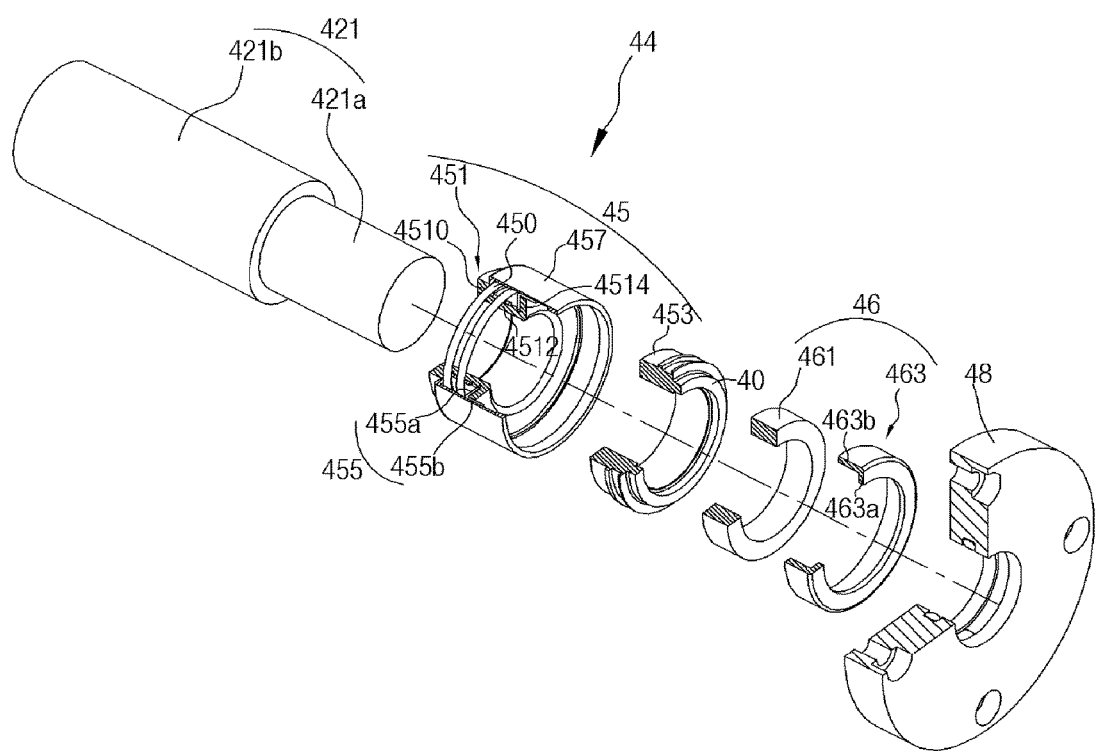
FIG. 13 is an exploded perspective view of FIG. 12.
Figure 14:
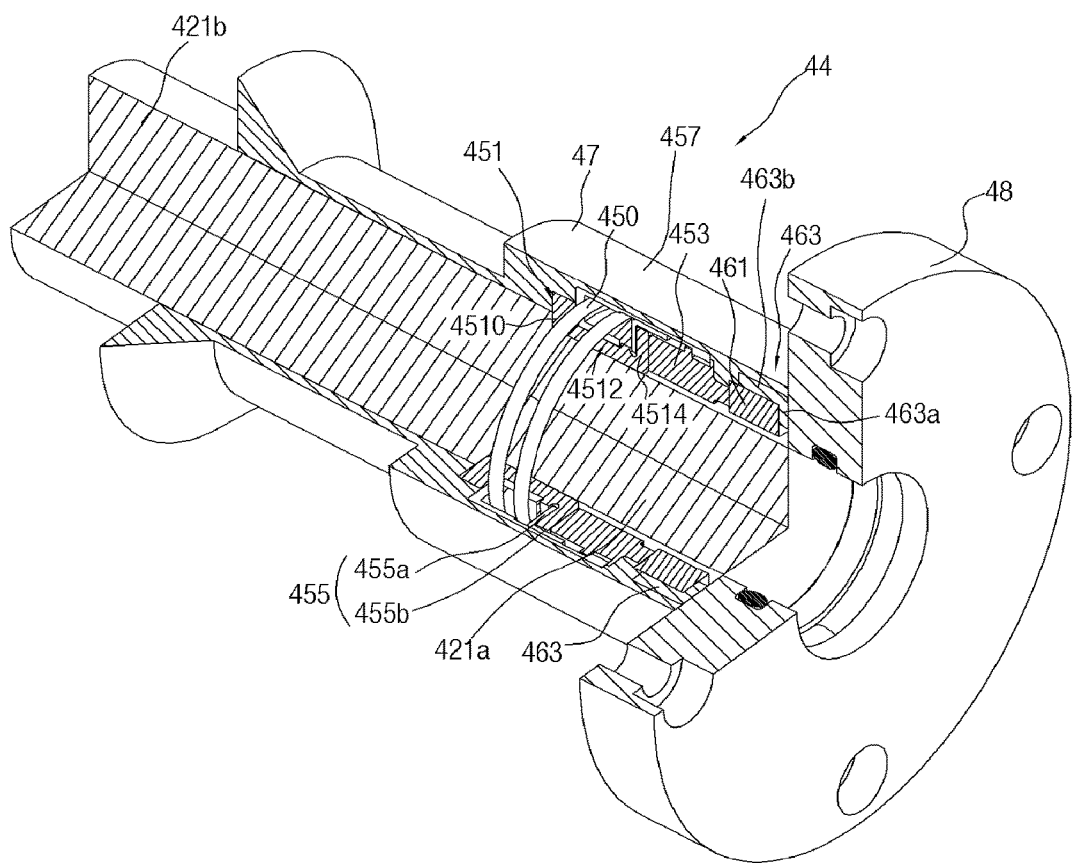
FIG. 14 is a partially enlarged perspective view of FIG. 12.

FIG. 12 is a partially enlarged perspective view showing an airtight sealing portion 44 of the driving portion 42, FIG. 13 is a partially exploded perspective view of FIG. 12, and FIG. 14 is a sectional view of FIG. 12.

Referring to FIGS. 12 to 14, in a candle-type ballast-water filtering device 1 according to a fourth embodiment of the present invention, the driving portion 42 may further include the airtight sealing portion 44 to prevent the backwash water of the suction portion 41 from leaking out of the housing 2 along the driving shaft 421.

The airtight sealing portion 44 is configured to prevent the backwash water introduced through the suction portion 41 from leaking out of the housing 2 along the driving shaft 421. Preferably, the airtight sealing portion is configured to surround the driving shaft 421 and be secured to a bottom surface of the lower portion 22 of the housing, thus preventing the backwash water from being discharged out of the housing 2 along the driving shaft 421. The airtight sealing portion 44 includes a rotor 45 that is secured to the driving shaft 421 to rotate along with the driving shaft 421, a stator 46 that forms a perturbation surface 40 in cooperation with the rotor 45 and is secured to the support plate 48, a driving-shaft casing 47 that accommodates the stator 46 and the rotor 45 and surrounds the driving shaft 421, and a support plate 48 that supports the driving-shaft casing 47 and the stator 46 and is coupled to the bottom of the housing 2.

The rotor 45 is secured to the driving shaft 421 to rotate along with the driving shaft 421. As shown in FIGS. 12 to 14, the rotor is configured to surround the driving shaft 421 and be secured to the driving shaft 421, thus rotating along with the driving shaft 421. The rotor 45 may include a rotor packing 451, a rotor perturbation ring 453, a cap plate 455, and a rotor casing 457. The rotor packing pressurizes the rotor perturbation ring 453 down by a restoring force of a spring 450 installed in a recess 452. The rotor perturbation ring forms the perturbation surface 40 with a stator perturbation ring 461 to be in close contact therewith by the pressure of the rotor packing 451. The cap plate transmits the restoring force of the spring 450 to the lower portion of the rotor packing 451. The rotor casing surrounds the rotor packing 451 and the rotor perturbation ring 453.

The rotor packing 451 is configured to pressurize the rotor perturbation ring 453 down by the restoring force of the spring 450 installed in the recess 452. Preferably, the rotor packing 451 includes an upper portion 4510 that supports the driving shaft 421 upwards, a packing body 4512 that communicates with the upper portion 4510 and surrounds the driving shaft 421, and a lower portion 4514 that communicates with the packing body 4512 and comes into close contact with a lower surface of the cap plate 455 and the rotor perturbation ring 453.

Referring to FIGS. 12 to 14, a small-diameter driving shaft 421a horizontally forms a right-angled step with the upper portion 4510 of the rotor packing 451 at a close-contact portion and is connected to a large-diameter driving shaft 421b. The upper portion 4510 of the rotor packing 451 is in close contact with the step of the driving shaft 421 in a vertical direction, so that the upper surface of the upper portion 4510 supports the lower surface of the large-diameter driving shaft 421b, and the axial inner circumference of the upper portion 4510 is in close contact with the small-diameter driving shaft 421a. Such a shape of upper portion 4510 serves to transmit upward pressure of the spring 450 from the rotor casing 457 to the large-diameter driving shaft 421b, thus supporting and locking the rotor 45 by a reaction force, and to make the rotor 45 come intro close contact with the small-diameter driving shaft 421a, thus locking the rotor. The packing body 4512 has an outer radius smaller than the upper portion 4510 of the packing, comes into close contact with the driving shaft 421, communicates with the upper portion 4510 of the packing and is connected to a lower portion 4514 of the packing. The packing body 4512 is formed of a vertically elastic member, so that its length may be extended in the vertical direction when the restoring force of the spring 450 acts thereon. The lower portion 4514 communicates with the packing body 4512 and has an outer radius larger than the upper portion 4510. The inner circumference of the lower portion 4514 comes into close contact with the driving shaft 421, and the lower surface of the lower portion 4514 comes into close contact with the rotor perturbation ring 453, thus pressurizing the lower rotor perturbation ring 453. The cap plate 455 includes a horizontal plate 455a coming into close contact with the upper surface of the lower portion 4514, and a vertical bent plate 455b extending perpendicularly from the horizontal plate 455a and coming into close contact with the side surface of the lower portion 4514, and transmits pressure generated by the spring 450 to the lower portion 4514. The vertical bent plate 455b of the cap plate 455 comes into close contact with and surrounds part of the outer surface of the rotor perturbation ring 453, because such a configuration prevents backwash water from being introduced between the rotor packing 451 and the rotor perturbation ring 453. Due to such a configuration, as shown in FIGS. 12 to 14, the rotor packing 451 forms the recess 452 which is open outwards when seen in a vertical sectional view, and the spring 450 retaining restoring energy with the cap plate 455 seated in the lower portion 4514 of the packing is seated in the recess 452.

The rotor perturbation ring 453 is configured to form the perturbation surface 40 with the stator perturbation ring 461 by the pressure of the rotor packing 451 and come into close contact therewith. Preferably, the rotor perturbation ring surrounds the driving shaft 421 with a predetermined space defined between the rotor perturbation ring and the driving shaft 421, comes into close contact with the lower surface of the rotor packing 451 in such a way that a close contact portion is surrounded with the cap plate 455, and forms the perturbation surface 40 with the stator perturbation ring 461.

The perturbation surface 40 is a surface at which the stator 46 comes into contact with the rotor 45, and has very fine pores. However, although moisture is present in the pores, the moisture is vaporized as it reaches a high temperature when the rotor 45 rotates, thus ensuring air-tightness. Further, even when the perturbation surface 40 is worn out, the rotor packing 451 is extended downwards by the restoring force of the spring 450, so that the entire length of the rotor 45 is restored to its original state and thereby a clearance of the perturbation surface 40 is kept constant. As shown in FIGS. 14 and 8, the rotor packing 451, the spring 450, the cap plate 455, and the rotor perturbation ring 453 are sealed again by the rotor casing 457, thus preventing the inflow of moisture.

The stator 46 is configured to form the perturbation surface 40 with the rotor 45 to be secured to the support plate 48. The stator includes a stator packing 463 that is secured to the support plate 48 to support the stator perturbation ring 461, and a stator perturbation ring 461 that comes into close contact with the stator packing 463 and forms the perturbation surface 40 with the rotor perturbation ring 453.

The stator packing 463 is configured to be secured to the support plate 48, thus supporting the stator perturbation ring 461. Preferably, the stator packing includes a horizontal plate 463a and a vertical bent plate 463b. The lower surface of the horizontal plate is in close contact with the upper surface of the support plate 48, and the upper surface of the horizontal plate is in close contact with the lower surface of the stator perturbation ring 46, in such a way as to surround the driving shaft 421. The vertical bent plate extends perpendicularly from an outer circumference of the horizontal plate 463a to surround the stator perturbation ring 461, an inner circumference thereof coming into close contact with an outer surface of the stator perturbation ring 461.

The stator perturbation ring 461 is configured to come into close contact with the stator packing 463 and form the perturbation surface 40 with the rotor perturbation ring 453. Preferably, as shown in FIGS. 12 to 14, the lower surface of the stator perturbation ring 461 comes into close contact with the upper surface of the horizontal plate 463a of the stator packing 463, and the outer circumference of the stator perturbation ring 461 comes into close contact with the inner circumference of the vertical bent plate 463b of the stator packing 463, and the stator perturbation ring surrounds the driving shaft 421 to be spaced apart therefrom by a predetermined interval and forms the perturbation surface 40 with the rotor perturbation ring 453. As such, the stator packing 463 comes into close contact with the stator perturbation ring 461, thus perfectly preventing the inflow of the backwash water and firmly locking the stator 46. As described above, the airtightness of the perturbation surface 40 is guaranteed.

The driving-shaft casing 47 is configured to accommodate the stator 46 and the rotor 45 therein and to surround the driving shaft 421. As shown in FIG. 3, the driving shaft 421 is located inside the suction portion 41 and the discharging portion 43, thus essentially preventing the possibility that original ballast water is introduced from the lower portion 22 of the housing. However, since the driving shaft 421 communicating with the suction portion 41 passes through the lower end of the discharging portion 43 and continuously passes through the lower surface of the lower portion 22 of the housing, backwash water may leak out of the penetrating portion 43a of the discharging portion 43 and the penetrating portion 22a of the lower portion of the housing. The driving-shaft casing 47 surrounds the driving shaft 421, the above-mentioned stator 46 and rotor 45, from the penetrating portion (see reference numeral 43*a* of FIG. 3) of the discharging portion 43 to the penetrating portion (see reference numeral 22*a* of FIG. 3) of the lower portion of the housing, thus preventing backwash water, flowing out from the penetrating portion (see reference numeral 43*a* of FIG. 3) of the discharging portion, from leaking out of the discharging portion 43 or the housing 2. Since space is defined in the driving-shaft casing 47, the backwash water circulates in the driving-shaft casing 47. By the above-mentioned stator 46 and rotor 45, airtight sealing is ultimately achieved.

The support plate 48 is configured to support the driving-shaft casing 47 and the stator 46 and be coupled to the bottom of the housing 2. In order to prevent the support plate from being affected by the rotating force of the driving shaft 421, it is necessary to firmly fix the stator 46. Thus, the support plate 48 allows the stator 46 as well as the above-mentioned driving-shaft casing 47 to be fixed, thus aiding in keeping the inside of the driving-shaft casing 47 airtight.

According to the present invention, in order to prevent the backwash water of the suction portion 41 from leaking out of the housing 2 along the driving shaft 421, the airtight sealing portion 44 is precisely formed around the driving shaft 421, thus significantly improving the air-tightness of the candle-type ballast-water filtering device 1 according to the present invention.

Figure 15:
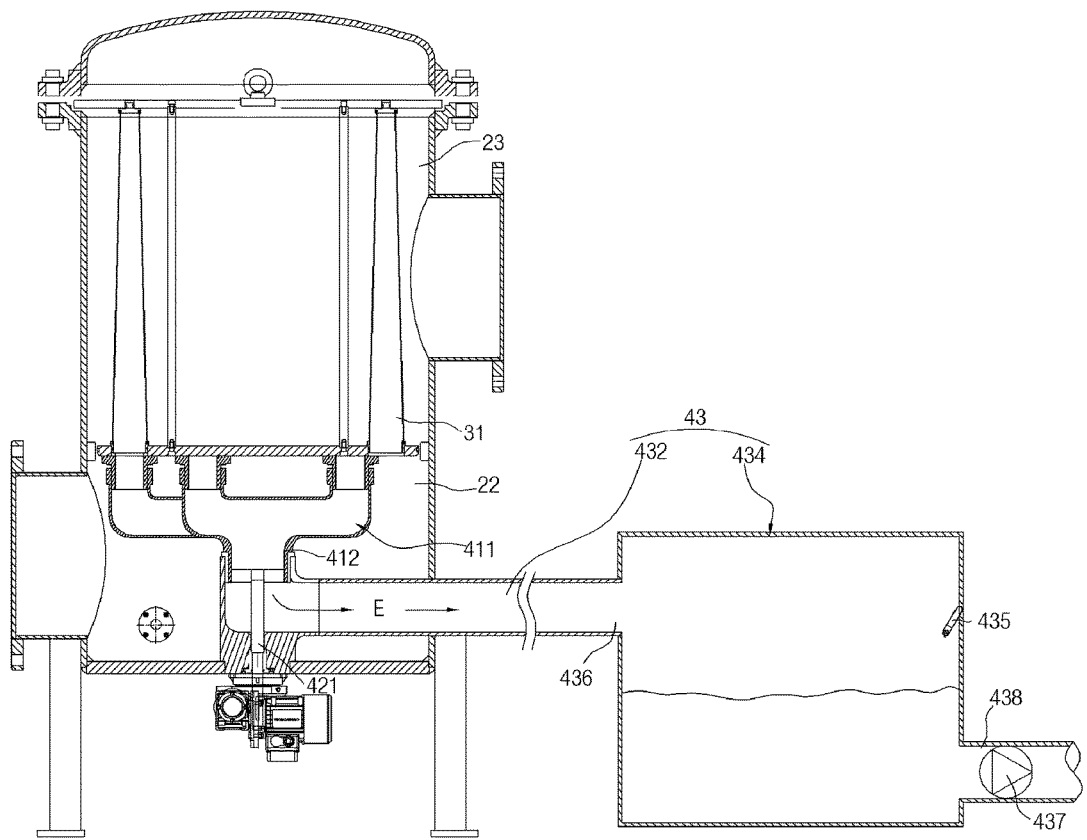
FIG. 15 is a conceptual view showing a back-pressure prevention tank provided on a discharge line of the discharging portion.

FIG. 15 is a conceptual view showing a back-pressure prevention tank 434 provided on a discharge line 432 of the discharging portion.

Referring to FIG. 15, the discharging portion 43 may further include the back-pressure prevention tank 434 on one discharge line 432 which is provided under the suction portion 41 to communicate therewith.

The back-pressure prevention tank 434 is configured to be located on the discharge line 432 which is provided to communicate with the suction portion 41, thus preventing the back pressure of the suction portion 41 from being created. Preferably, the tank is a cylindrical tank that is coupled to an end of the discharge line 432 to accumulate backwash water therein, the discharge line communicating with the suction portion 41 to discharge the backwash water. If a large amount of backwash water is accumulated in the discharging portion 43, the pressure of the discharging portion 43 is increased and thereby the pressure of the suction portion 41 is also increased. Hence, even when the flushing arm 411 communicates with the filter element 31 to perform backwashing, a differential pressure between the filter element 31 and the suction portion 41 is reduced, so that the suction force for the backwash water is lessened and thereby backwashing is not performed sufficiently. Consequently, pressure in the filter element 31 is also not reduced, so that a differential pressure between the housing body 23 and the lower portion 22 of the housing is also reduced, and thereby the inflow of the ballast water into the filter element 31 slows down. Consequently, the entire capacity for filtering the ballast water is deteriorated. In order to solve the above-mentioned problems, according to the present invention, the back-pressure prevention tank 434 is installed at the end of the discharge line 432 of the discharging portion 43 to discharge backwash water when it exceeds a predetermined water level in the back-pressure prevention tank 434, thus preventing back pressure from being created. To this end, the back-pressure prevention tank 434 is configured such that an outlet port 438 for discharging backwash water is lower than an inlet port 436 for introducing the backwash water, thus allowing a water level in the back-pressure prevention tank 434 to be lower than the inlet port 436.

Further, the back-pressure prevention tank 434 includes a water-level measuring sensor 435 that measures a water level in the tank, and a pump 437 that is operated to discharge backwash water from the tank when the water level measured by the water-level measuring sensor 435 exceeds a predetermined level. Thus, when the water level in the tank exceeds the predetermined level, the water-level measuring sensor 435 senses that the water level exceeds the predetermined level, and then the backwash water stored in the tank is discharged through the outlet port 438 by the pump 437.

The interaction between the above-mentioned components of the present invention will be described with reference to FIGS. 2 to 15.

When the candle-type ballast-water filtering device 1 is operated, the ballast water is introduced into the lower portion 22 of the housing through the inlet portion 21 that is formed through the lower portion 22. The introduced original ballast water moves along the inner wall of the lower portion 22 of the housing and then is held in the housing body 23. Subsequently, when pressure in the filter element 31 passing through the lower cover 232 is reduced, the water enters the filter element 31. The original ballast water is filtered by the filter element 31. If the flushing body 412 of the suction portion 41 is rotated along with the driving shaft 421 by the rotating force of the driving portion 42, the flushing arm 411 coupled thereto rotates along a circumferential surface around the driving shaft 421 and sequentially communicates with the individual filter element 31. According to the present invention, the driving portion 42 is not located on the upper portion of the ballast-water filtering device 1 but on the lower portion thereof, so that the driving shaft 421 does not pass through the housing body 23, and thereby a space is secured in the housing body 23 and the number of filter elements 31 can be increased, thus increasing the filtering efficiency in the ballast-water filtering device 1 of the same volume. Further, the driving shaft 421 does not pass through the housing 2, so that it is unnecessary to maintain air-tightness on the upper and lower covers 231 and 232 of the housing body 23, and thereby a structure is simplified, sealing cost is reduced, and the mixing of the original ballast water with the filtered water due to the defective sealing does not occur. Further, the structure is simplified, so that it is easy to install, and it is unnecessary to set the center of the rotating shaft. Moreover, when the inside of the filtering device is repaired or its components are replaced with new ones, a worker has only to remove the upper portion 25 of the housing and the upper cover 231 without the necessity of removing the driving portion 42, thus affording convenient maintenance. When comparing such a configuration with the conventional configuration wherein the driving portion 42 is provided on the upper portion of the filtering device, the entire height of the filtering device is lowered, thus making it possible to install the filtering device even in a small space of the vessel.

After the filtering operation is performed, foreign substances are caught in the filter element. Since the housing body 23 has a higher pressure than the suction portion 41 communicating with the filter element 31, a differential pressure occurs. Thereby, while the ballast water of the housing body 23 enters the filter element 31, it is introduced into the flushing arm 411 along with the foreign substances of the filter element 31. The backwash water entering the flushing arm 411 moves along the flushing body 412 to the discharging portion 43 and then is discharged along the discharge line 432 to the outside. As described above, the present invention is configured such that the driving portion 42 is provided on the lower portion 22 of the housing, thus maximizing the space of the housing body 23 and allowing filter elements 31 to be installed at high density. Therefore, since the suction portion 41 has the plurality of flushing arms 411, it is possible to perform backwashing simultaneously by at least one or more filter elements 31 disposed along one or more concentric paths having different diameters, so that filtering efficiency is significantly improved as compared to the conventional filtering device. Further, the airtight sealing portion 44 is formed to prevent the backwash water of the suction portion 41 from leaking out of the housing 2 along the driving shaft 421, so that the air-tightness of the driving shaft 421 is significantly improved.

When the backwash water is discharged through the discharging portion 43, the water is filled in the back-pressure prevention tank 434 provided on the end of the discharge line 432. If the water-level measuring sensor 435 senses that the water in the back-pressure prevention tank 434 exceeds the predetermined water level, the pump 437 is operated to discharge the backwash water from the tank. Therefore, the differential pressure is maintained between the discharging portion 43, the suction portion 41 and the filter element 31, thus enabling smooth filtering.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high efficiency candle-type ballast-water filtering device having a high-density filter structure, comprising:
    a housing having an inlet portion and an outlet portion that allows ballast water to flow into and out of a vessel;
    a filter portion located in the housing and configured to filter original ballast water introduced through the inlet portion; and
    an automatic washing portion configured for washing foreign substances off of the filter portion,
    wherein the automatic washing portion is located in a lower portion of the housing and comprises a suction portion that sucks backwash water containing foreign substances attached to the filter portion, a driving portion that is connected to the suction portion to rotate the suction portion, and a discharging portion that accommodates a side of the suction portion and discharges backwash water sucked by the suction portion,
    wherein the filter portion comprises a plurality of filter elements for filtering and backwashing, the plurality of filter elements being arranged along concentric paths around a longitudinal axis of a driving shaft of the driving portion,
    wherein the suction portion comprises a plurality of flushing arms that rotate around the longitudinal axis of the driving shaft by the driving portion to communicate with the respective filter elements on the concentric paths of the filter portion and thereby receive backwash water, and
    wherein the driving portion being connected to the suction portion via the driving shaft wherein the driving portion comprises an airtight sealing portion to prevent the backwash water of the suction portion from leaking out of the housing along the driving shaft, the airtight sealing portion comprising:
        a rotor secured to the driving shaft to rotate along with the driving shaft;
        a stator forming a perturbation surface in cooperation with the rotor and secured to a support plate;
        a driving-shaft casing accommodating the stator and the rotor and surrounding the driving shaft; and
        the support plate supporting the driving-shaft casing and the stator, and coupled to a bottom of the housing.

2. The high efficiency candle-type ballast-water filtering device according to claim 1, wherein the suction portion further comprises a flushing body that communicates with the plurality of flushing arms to render the sucked backwash water to pass and is secured to the driving shaft to transmit a rotating force from the driving shaft to the suction portion, the filter elements are arranged along the concentric paths having different diameters around the driving shaft, and the plurality of flushing arms are radially arranged around the driving shaft to communicate with one of the filter elements on each of the concentric paths.

3. The high efficiency candle-type ballast-water filtering device according to claim 2, wherein the discharging portion comprises:
    an elongated discharge line having a first end fluid coupled to the flushing body at a location within the housing and an opposing second end disposed outside of the housing; and
    a back-pressure prevention tank having an inlet port fluid coupled with the second end of the discharge line and having an outlet port, the outlet port being located lower than the inlet port so that a water level in the back-pressure prevention tank can be kept lower than the inlet port, thereby preventing back pressure on the discharge line from increasing.

4. The high efficiency candle-type ballast-water filtering device according to claim 2, wherein the flushing body comprises driving-shaft locking means to lock an end of the driving shaft.

5. The high efficiency candle-type ballast-water filtering device according to claim 4, wherein the driving-shaft locking means comprises a bar plate crossing a central line of the flushing body, and the driving shaft comprises on an end thereof a plate groove into which the bar plate is fitted.

6. The high efficiency candle-type ballast-water filtering device according to claim 1, wherein the rotor comprises a rotor packing that pressurizes a rotor perturbation ring downwards by a restoring force of a spring provided in a recess, the rotor perturbation ring that forms a perturbation surface in cooperation with a stator perturbation ring to come into close contact therewith by pressure of the rotor packing, a cap plate transmitting the restoring force of the spring to a lower portion of the rotor packing, and a rotor casing surrounding the rotor packing and the rotor perturbation ring, and
    the stator comprises a stator packing that is secured to the support plate to support a stator perturbation ring, and the stator perturbation ring that comes into close contact with the stator packing and forms the perturbation surface in cooperation with the rotor perturbation ring.

7. The high efficiency candle-type ballast-water filtering device according to claim 1, wherein the discharging portion comprises a back-pressure prevention tank on one discharge line that is provided under the suction portion to communicate therewith, so that backwash water and foreign substances of the discharge line are primarily stored in the back-pressure prevention tank, thus preventing back pressure on the discharge line from increasing.

8. The high efficiency candle-type ballast-water filtering device according to claim 7, wherein the back-pressure prevention tank is configured such that an outlet port for discharging the backwash water is located to be lower than an inlet port for introducing the backwash water, so that a water level in the back-pressure prevention tank is kept lower than the inlet port, thus preventing the back pressure on the discharge line from increasing.

9. The high efficiency candle-type ballast-water filtering device according to claim 8, wherein the back-pressure prevention tank comprises a water-level measuring sensor measuring a water level in the tank, and a pump operated to discharge wash water stored in the tank when the water level measured by the water-level measuring sensor exceeds a predetermined level, thus keeping the water level in the tank to a predetermined level or less and preventing the back pressure on the discharge line from increasing.

10. A high efficiency candle-type ballast-water filtering device having a high-density filter structure, comprising:
a housing having an inlet portion and an outlet portion that allows ballast water to flow into and out of a vessel;
a filter portion located in the housing and configured to filter original ballast water introduced through the inlet portion; and
an automatic washing portion configured for washing foreign substances off of the filter portion,
wherein the automatic washing portion is located in a lower portion of the housing and comprises a suction portion that sucks backwash water containing foreign substances attached to the filter portion, a driving portion that is connected to the suction portion to rotate the suction portion, and a discharging portion that accommodates a side of the suction portion and discharges backwash water sucked by the suction portion,
wherein the filter portion comprises a plurality of filter elements for filtering and backwashing, the plurality of filter elements being arranged along concentric paths around a longitudinal axis of a driving shaft of the driving portion,
wherein the suction portion comprises a plurality of flushing arms that rotate around the longitudinal axis of the driving shaft by the driving portion to communicate with the respective filter elements on the concentric paths of the filter portion and thereby receive backwash water, and a flushing body that communicates with the flushing arms and through which the sucked backwash water can pass, the driving shaft being coupled to the flushing body to transmit a rotating force from the driving shaft to the suction portion,
wherein at least a portion of the driving portion is located between legs projecting from the housing, the legs being capable of supporting the filtering device, the driving portion being connected to the suction portion via the driving shaft which passes through the discharging portion,
wherein the discharging portion is fluid coupled with the flushing body and a bearing couples the discharging portion to the flushing body so that the suction portion can rotate relative to the discharging portion,
wherein the flushing body comprises driving-shaft locking means for locking an end of the driving shaft and allows the suction portion to be rotated when the driving shaft rotates,
wherein the driving portion comprises an airtight sealing portion to prevent the backwash water of the suction portion from leaking out of the housing along the driving shaft, the airtight sealing portion comprising:
a rotor secured to the driving shaft to rotate along with the driving shaft;
a stator forming a perturbation surface in cooperation with the rotor and secured to a support plate;
a driving-shaft casing accommodating the stator and the rotor and surrounding the driving shaft; and
the support plate supporting the driving-shaft casing and the stator, and coupled to a bottom of the housing.

* * * * *